United States Patent
Huke et al.

(10) Patent No.: US 11,967,203 B2
(45) Date of Patent: Apr. 23, 2024

(54) METHOD OF PROVIDING WAGERING NOTIFICATIONS THROUGH HAPTICS

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 18 days.

(21) Appl. No.: 17/518,252

(22) Filed: Nov. 3, 2021

(65) Prior Publication Data

US 2022/0139154 A1    May 5, 2022

Related U.S. Application Data (60) Provisional application No. 63/109,001, filed on Nov. 3, 2020.

(51) Int. Cl.
| | |
|---|---|
| G07F 17/32 | (2006.01) |
| G06F 3/01 | (2006.01) |
| G06F 3/16 | (2006.01) |
| G06F 16/2457 | (2019.01) |
| G06Q 50/34 | (2012.01) |

(52) U.S. Cl.
CPC ............ *G07F 17/323* (2013.01); *G06F 3/016* (2013.01); *G06F 3/16* (2013.01); *G06F 16/2457* (2019.01); *G06Q 50/34* (2013.01); *G07F 17/3227* (2013.01); *G07F 17/3288* (2013.01)

(58) Field of Classification Search
CPC ............... G07F 17/323; G07F 17/3227; G07F 17/3288; G06F 3/016; G06F 3/16; G06F 16/2457; G06Q 50/34
See application file for complete search history.

(56) References Cited

U.S. PATENT DOCUMENTS

| | | | |
|---|---|---|---|
| 2012/0108337 A1 | 5/2012 | Kelly et al. | |
| 2017/0028295 A1 | 2/2017 | Patton et al. | |
| 2017/0103600 A1 | 4/2017 | Vann et al. | |
| 2018/0018014 A1 | 1/2018 | Lutnick et al. | |
| 2022/0122408 A1* | 4/2022 | Huke | G07F 17/3288 |
| 2022/0165116 A1* | 5/2022 | Huke | H04W 4/021 |
| 2022/0222999 A1* | 7/2022 | Huke | G07F 17/3288 |

OTHER PUBLICATIONS

International Search Report and Written Opinion dated Jan. 24, 2022 in corresponding International Patent Application No. PCT/US2021/057918; 14 pages.

* cited by examiner

*Primary Examiner* — Ronald Laneau
(74) *Attorney, Agent, or Firm* — Maier & Maier, PLLC (57) ABSTRACT

The wager preferences of the user of a wagering app can be identified and paired with a recognizable notification including haptics so that when a wagering opportunity matching the user's preferences is available, the user is notified using a recognizable notification to increase the likelihood that the user will act upon the notification and place a wager.

13 Claims, 3 Drawing Sheets

A System for Haptic Wager Notification

Fig.1 A System for Haptic Wager Notification

Fig.2 Base Wagering Module

Fig.3 Preferences Module

Fig.4 Notification Module

Fig.5 Notification Database

METHOD OF PROVIDING WAGERING NOTIFICATIONS THROUGH HAPTICS

CROSS-REFERENCE TO RELATED APPLICATIONS

The present patent application claims benefit and priority to U.S. Provisional Patent Application No. 63/109,001 filed on Nov. 3, 2020, which is hereby incorporated by reference into the present disclosure.

FIELD

The present disclosures are generally related to play-by-play or in-play wagering on live sporting events.

BACKGROUND

Driving engagement within a wagering network is key to maximizing a bettor's wagering potential. Unfortunately, many users prefer to place wagers only on specific teams, players, types of wagers, etc., or combinations thereof. This can result in significant time between wagers the bettor would consider placing during which the bettor may leave the application resulting in missed wagering opportunities.

While a bettor may be interested in placing wagers on a live event, they may not be dedicated to watching the live event or may otherwise have their attention captured by another event or situation. Without intervention, this bettor likely would not place wagers on the live event. Thus, a general notification attempting to prompt engagement would be ineffective against such a bettor.

Mobile devices and notifications have become ubiquitous; however, some notifications may go unintentionally ignored. It is therefore desirable to differentiate notifications and make them increasingly more noticeable and recognizable by a bettor.

Pairing recognizable notifications with wagering opportunities matching a user's preferences allow users to leave a wagering application during a live event without missing wagering opportunities that they may be interested in placing a wager on. Similarly, this maximizes the potential wagers placed by the user of a wagering application without requiring the user to be engaged with the wagering app throughout the live event. Similarly, this may enable users to be engaged with multiple live events simultaneously or be selectively engaged with the wagering application while their attention is otherwise consumed.

BRIEF DESCRIPTIONS OF THE DRAWINGS

The accompanying drawings illustrate various embodiments of systems, methods, and various other aspects of the embodiments. Any person with ordinary art skills will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. The described embodiments are not necessarily to be construed as preferred or advantageous over other embodiments. Moreover, the terms embodiments of the invention, embodiments, or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that specific circuits can perform the various sequence of actions described herein (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in several different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, and/or hit performed by a participant in a sporting event. In some embodiments, an action may be a strategic decision made by a participant in the sporting event, such as a player, coach, management, etc. In some embodiments, an action may be a penalty, foul, or other type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity based on the outcome of a future event, such as the results of a game or event. It may be understood that non-monetary items may be the subject of a "bet" or "wager" as well, such as points or anything else that can be quantified for a "bet" or "wager." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be made for certain amount or for a future time. A "bet" or "wager" can be made for being able to answer a question correctly. A "bet" or "wager" can be made within a certain period. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain to place bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example, up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sportsbook has reduced its betting limits, usually because of weather or the uncertain status of injured players, is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides," "favorite," "chalk," "circled game," "laying the points price," "dog," and "underdog" can be integrated into the embodiments in a variety of manners.

The "money line" refers to the odds expressed in terms of money. With money odds, whenever there is a minus (−), the player "lays" or is "laying" that amount to win (for example, $100); where there is a plus (+), the player wins that amount for every $100 wagered. A "straight bet" refers to an individual wager on a game or event that will be determined by a point spread or money line. The term "straight-up" means winning the game without any regard to the "point spread," a "money-line" bet. "Money line," "straight bet," and "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread." A handicap of the "point spread" value is given to the favorite team so bettors can choose sides at equal odds. "Cover the spread" means that a favorite wins an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread." The "opening line" means the earliest line posted for a particular sporting event or game. The term "pick" or "pick 'em" refers to a game when neither team is favored in an event or game. "Line," "cover the spread," "cover," "tie," "pick," and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. The event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total," "over," and "under" can be integrated into the embodiments in a variety of manners.

A "parlay" is a single bet that links together two or more wagers; to win the bet, the player must win all the wagers in the "parlay." If the player loses one wager, the player loses the entire bet. However, if they win all the wagers in the "parlay," the player receives a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay," "round robin," "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games, and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events. Typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both pitchers scheduled to start a game start. If they do not, the bet is deemed "no action" and refunded. The "run line" in baseball refers to a spread used instead of the money line. "Listed pitchers," "no action," and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle," "juice," vigorish," "vig," and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individuals that would deploy, for fees, and may be part of, or perform, various system elements or method steps in the embodiments.

Managed service user interface service is a service that can help customers (1) manage third parties, (2) develop the web, (3) perform data analytics, (4) connect thru application program interfaces and (4) track and report on player behaviors. A managed service user interface can be integrated into the embodiments in a variety of manners.

Managed service risk management service are services that assist customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling, and (4) customer service assistance. These managed service compliance services can be integrated into the embodiments in a variety of manners.

Managed service pricing and trading service is a service that helps customers with (1) official data feeds, (2) data visualization, and (3) land based on property digital signage. These managed service pricing and trading services can be integrated into the embodiments in a variety of manners.

Managed service and technology platforms are services that help customers with (1) web hosting, (2) IT support, and (3) player account platform support. These managed service and technology platform services can be integrated into the embodiments in a variety of manners.

Managed service and marketing support services are services that help customers (1) acquire and retain clients and users, (2) provide for bonusing options, and (3) develop press release content generation. These managed service and marketing support services can be integrated into the embodiments in a variety of manners.

Payment processing services are services that help customers with (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat players to free bets, odds boosts, enhanced access, and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by always managing commission and availability. The "cash out" or "pay out" or "payout" can be integrated into the embodiments in a variety of manners, including both monetary and non-monetary payouts, such as points, prizes, promotional or discount codes, and the like.

"Customized betting" may allow customers to have tailored personalized betting experiences with sophisticated tracking and analysis of players' behavior. "Customized betting" can be integrated into the embodiments in a variety of manners.

Kiosks are devices that offer interactions with customers, clients, and users with a wide range of modular solutions for both retail and online sports gaming. Kiosks can be integrated into the embodiments in a variety of manners.

Business Applications are an integrated suite of tools for customers to manage the everyday activities that drive sales, profit, and growth by creating and delivering actionable insights on performance to help customers to manage the sports gaming. Business Applications can be integrated into the embodiments in a variety of manners.

State-based integration may allow for a given sports gambling game to be modified by states in the United States or other countries, based upon the state the player is in, mobile phone, or other geolocation identification means. State-based integration can be integrated into the embodiments in a variety of manners.

Game Configurator may allow for configuration of customer operators to have the opportunity to apply various chosen or newly created business rules on the game as well as to parametrize risk management. The Game Configurator can be integrated into the embodiments in a variety of manners.

"Fantasy sports connectors" are software connectors between method steps or system elements in the embodiments that can integrate fantasy sports. Fantasy sports allow a competition in which participants select imaginary teams from among the players in a league and score points according to the actual performance of their players. For example, if a player in fantasy sports is playing at a given real-time sport, odds could be changed in the real-time sports for that player.

Software as a service (or SaaS) is a software delivery and licensing method in which software is accessed online via a subscription rather than bought and installed on individual computers. Software as a service can be integrated into the embodiments in a variety of manners.

Synchronization of screens means synchronizing bets and results between devices, such as TV and mobile, PC, and wearables. Synchronization of screens can be integrated into the embodiments in a variety of manners.

Automatic content recognition (ACR) is an identification technology that recognizes content played on a media device or present in a media file. Devices containing ACR support enable users to quickly obtain additional information about the content they see without any user-based input or search efforts. A short media clip (audio, video, or both) is selected to start the recognition. This clip could be selected from within a media file or recorded by a device. Through algorithms such as fingerprinting, information from the actual perceptual content is taken and compared to a database of reference fingerprints, wherein each reference fingerprint corresponds with a known recorded work. A database may contain metadata about the work and associated information, including complementary media. If the media clip's fingerprint is matched, the identification software returns the corresponding metadata to the client application. For example, during an in-play sports game, a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet"—which is a computer-generated data point—is placed above the player that is bet on. Augmented reality can be integrated into the embodiments in a variety of manners.

Some embodiments of this disclosure, illustrating all its features, will now be discussed in detail. It can be understood that the embodiments are intended to be open-ended in that an item or items used in the embodiments is not meant to be an exhaustive listing of such item or items or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

Figure 1:
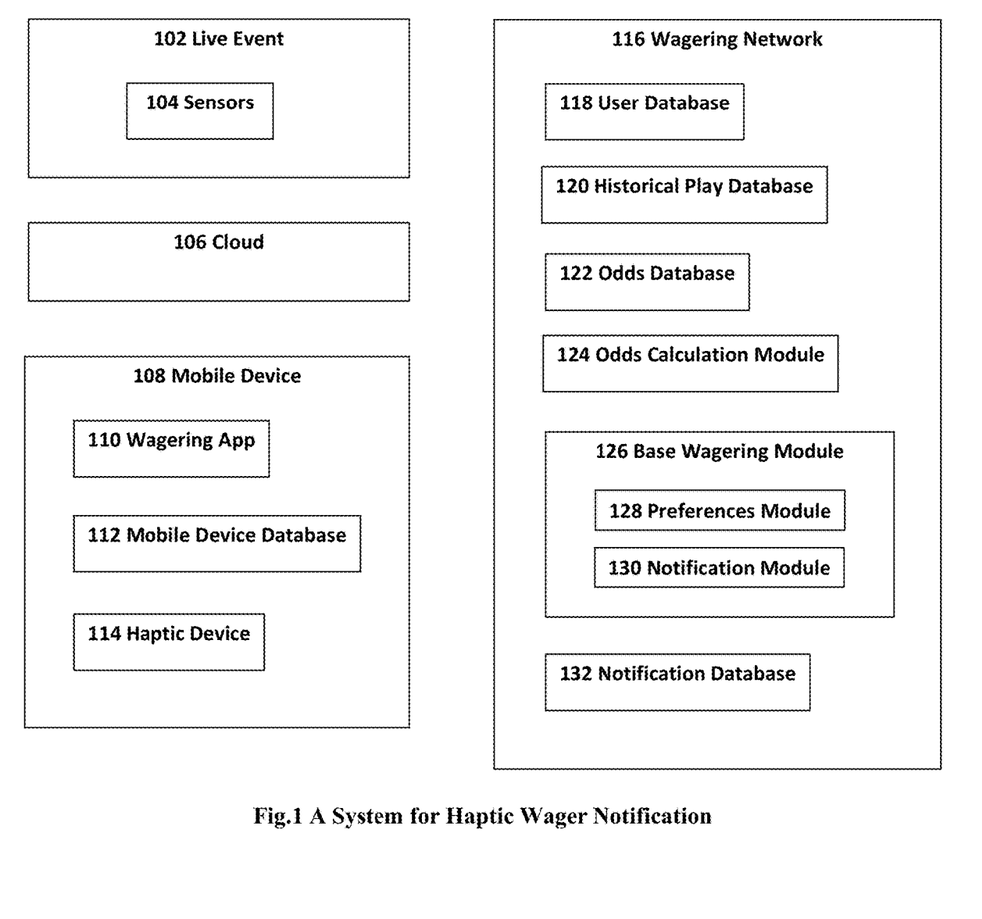
FIG. 1: illustrates a system for haptic wager notification, according to an embodiment.

FIG. 1 is a system for haptic wager notification. This system may include a live event 102, for example, a sporting event such as a football, basketball, baseball, or hockey game, tennis match, golf tournament, eSports, or digital game, etc. The live event 102 may include some number of actions or plays, upon which a user, bettor, or customer can place a bet or wager, typically through an entity called a sportsbook. There are numerous types of wagers the bettor can make, including, but not limited to, a straight bet, a money line bet, or a bet with a point spread or line that the bettor's team would need to cover if the result of the game with the same as the point spread the user would not cover the spread, but instead the tie is called a push. If the user bets on the favorite, points are given to the opposing side, which is the underdog or longshot. Betting on all favorites is referred to as chalk and is typically applied to round-robin or other tournaments' styles. There are other types of wagers, including, but not limited to, parlays, teasers, and prop bets, which are added games that often allow the user to customize their betting by changing the odds and payouts received on a wager. Certain sportsbooks will allow the bettor to buy points which moves the point spread off the opening line. This increases the price of the bet, sometimes by increasing the juice, vig, or hold that the sportsbook takes. Another type of wager the bettor can make is an over/under, in which the user bets over or under a total for the live event 102, such as the score of an American football game or the run line in a baseball game, or a series of actions in the live event 102. Sportsbooks have several bets they can handle, limiting the number of wagers they can take on either side of a bet before they will move the line or odds off the opening line. Additionally, there are circumstances, such as an injury to an important player like a listed pitcher, in which a sportsbook, casino, or racino may take an available wager off the board. As the line moves, an opportunity may arise for a bettor to bet on both sides at different point spreads to middle, and win, both bets. Sportsbooks will often offer bets on portions of games, such as first-half bets and half-time bets. Additionally, the sportsbook can offer futures bets on live events in the future. Sportsbooks need to offer payment processing services to cash out customers which can be done at kiosks at the live event 102 or at another location.

Further, embodiments may include a plurality of sensors 104 that may be used such as motion, temperature, or humidity sensors, optical sensors, and cameras such as an RGB-D camera which is a digital camera capable of capturing color (RGB) and depth information for every pixel in an image, microphones, radiofrequency receivers, thermal imagers, radar devices, lidar devices, ultrasound devices, speakers, wearable devices, etc. Also, the plurality of sensors 104 may include but are not limited to, tracking devices, such as RFID tags, GPS chips, or other such devices embedded on uniforms, in equipment, in the field of play and boundaries of the field of play, or on other markers in the field of play. Imaging devices may also be used as tracking devices, such as player tracking, which provide statistical information through real-time X, Y positioning of players and X, Y, Z positioning of the ball.

Further, embodiments may include a cloud 106 or a communication network that may be a wired and/or wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, or other communication techniques that are known in the art. The communication network may allow ubiquitous access to shared pools of configurable system resources and higher-level services that can be rapidly provisioned with minimal management effort, often over the internet, and relies on sharing resources to achieve coherence and economies of scale, like a public utility. In contrast, third-party clouds allow organizations to focus on their core businesses instead of expending resources on computer infrastructure and maintenance. The cloud 106 may be communicatively coupled to a peer-to-peer wagering network 114, which may perform real-time analysis on the type of play and the result of the play. The cloud 106 may also be synchronized with game situational data such as the time of the game, the score, location on the field, weather conditions, and the like, which may affect the choice of play utilized. For example, in an exemplary embodiment, the cloud 106 may not receive data gathered from the sensors 104 and may, instead, receive data from an alternative data feed, such as Sports Radar®. This data may be compiled substantially immediately following the completion of any play and may be compared with a variety of team data and league data based on a variety of elements, including the current down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include but are not limited to, keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide semiconductor (CMOS) sensors, accelerometers, IR optical sensors, pressure sensors, magnetometer sensors, angular rate sensors, depth sensors, proximity sensors, ambient light sensors, gyroscopic sensors, or other sensors. Output devices may include but are not limited to, video displays, graphical displays, speakers, headphones, inkjet printers, laser printers, or 3D printers. Devices may include, but are not limited to, a combination of multiple input or output devices such as, Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs including, but not limited to, Microsoft KINECT, SIRI for iPhone by Apple, Google Now, or Google Voice Search. Additional user devices have both input and output capabilities including but not limited to, haptic feedback devices, touchscreen displays, or multi-touch displays. Touchscreen, multi-touch displays, touchpads, touch mice, or other touch sensing devices may use different technologies to sense touch, including but not limited to, capacitive, surface capacitive, projected capacitive touch (PCT), in-cell capacitive, resistive, IR, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices, including but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device, or a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., USB, SCSI, FireWire, Ethernet, Gigabit Ethernet, Fiber Channel, or Thunderbolt buses. In some embodiments, the mobile device 108 could be an optional component and would be utilized in a situation where a paired wearable device employs the mobile device 108 for additional memory or computing power or connection to the internet.

Further, embodiments may include a wagering software application or a wagering app 110, which is a program that enables the user to place bets on individual plays in the live event 102, streams audio and video from the live event 102, and features the available wagers from the live event 102 on the mobile device 108. The wagering app 110 may allow the user to interact with the wagering network 114 to place bets and provide payment/receive funds based on wager outcomes.

Further, embodiments may include a mobile device database 112 that may store some or all the user's data, the live event 102, or the user's interaction with the wagering network 114.

Further, embodiments may include a haptic device 114, which may provide a physical vibration or movement intended to be felt by a person. A haptic device 114 may be a vibrotactile device comprised of a rotating or oscillating mass with a variable frequency, duration, and interval between activations. A haptic device 114 may alternatively be an ultrasonic device capable of creating a pressure wave near an object's surface, creating a sensation that a person near the object can feel. A haptic device 114 may also use microfluidics, such that air can be forced through ports in a wearable device, such as a smartwatch or clothing worn by a user, which can create localized regions of pressure resulting in a haptic sensation. A haptic device 114 may further be a force control device in a mechanism such as a button, lever, joystick, or other control devices such that the mechanism's resistance may be varied to provide sensation, typically as a form of feedback to the user of the mechanism. Alternatively, a haptic device 114 may be a surface haptic device that can modulate a surface's texture to create tactile effects such as varying the amount of friction provided by the surface or physical features that may arise from the surface. Finally, a haptic device 114 may be a component of a mobile device 108 or a wearable device to provide haptic notifications or tactile feedback when using a touchscreen. The haptic device 114 may alternatively be a standalone device or integrated into objects such as a stylus, pen, article of clothing, etc.

Further, embodiments may include the wagering network 116, which may perform real-time analysis on the type of play and the result of a play or action. The wagering network 116 (or the cloud 106) may also be synchronized with game situational data, such as the time of the game, the score, location on the field, weather conditions, and the like, which may affect the choice of play utilized. For example, in an exemplary embodiment, the wagering network 116 may not receive data gathered from the sensors 104 and may, instead, receive data from an alternative data feed, such as SportsRadar®. This data may be provided substantially immediately following the completion of any play and may be compared with a variety of team data and league data based on a variety of elements, including the current down, possession, score, time, team, and so forth, as described in various exemplary embodiments herein. The wagering network 116 can offer several software as a service (SaaS) managed services such as user interface service, risk management service, compliance, pricing and trading service, IT support of the technology platform, business applications, game configuration, state-based integration, fantasy sports connection, integration to allow the joining of social media, or marketing support services that can deliver engaging promotions to the user.

Further, embodiments may include a user database 118, which may contain data relevant to all users of the wagering network 116 and may include, but is not limited to, a user ID, a device identifier, a paired device identifier, wagering history, or wallet information for the user. The user database 118 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. In addition, the user database 118 may contain betting lines and search queries. The user database 118 may be searched based on a search criterion received from the user. Each betting line may include, but is not limited to, a plurality of betting attributes such as at least one of the live event 102, a team, a player, an amount of wager, etc. The user database 118 may include but is not limited to information related to all the users involved in the live event 102. In one exemplary embodiment, the user database 118 may include information for generating a user authenticity report and a wagering verification report. Further, the user database 118 may be used to store user statistics like, but not limited to, the retention period for a particular user, frequency of wagers placed by a particular user, the average amount of wager placed by each user, etc.

Further, embodiments may include a historical plays database 120 that may contain play data for the type of sport being played in the live event 102. For example, in American Football, for optimal odds calculation, the historical play data may include metadata about the historical plays, such as time, location, weather, previous plays, opponent, physiological data, etc.

Further, embodiments may utilize an odds database 122—that may contain the odds calculated by an odds calculation module 124—to display the odds on the user's mobile device 108 and take bets from the user through the mobile device wagering app 110.

Further, embodiments may include the odds calculation module 124, which may utilize historical play data to calculate odds for in-play wagers.

Further, embodiments may include a base wagering module 126 which may allow a user to log in and configure their notification preferences—which may used to provide haptic and audio notifications to the user when a wager becomes available—matching the user's preferences while the user may be not interacting with the wagering app 110. The user's notification preferences may be manually set by the user or may be determined based upon the user's previous wagering history. The base wagering module 126 may further utilize a notification module 130 to determine a user's notification preferences.

Further, embodiments may include a preferences module 128, which may query a user database 118 and a notification database 132 and prompt a user for input to determine the user's notification preferences, comprising the types of wagers and odds for which the user would like to receive notifications, and further determining customized notification to be provided to the user when such wagers are available. The notifications may include a haptic component and an audible component. If the user does not provide a preference, a default setting may alternatively be selected.

Further, embodiments may include a notification module 130, which may query a notification database 132 for the proper notification to be sent to a user to inform them that a wager may be available. The notification comprising a haptic component may additionally include an audible component. The notification module 130 may further monitor the user's interaction with the mobile device 108 and determine the user's status, such as whether the user is engaged, dismissive, or unresponsive.

Further, embodiments may include a notification database 132 which may comprise one or more notification categories or lists. A notification category comprised of one or more wagering parameters such as type of live event 102, type of wager, parties involved including an athletics team or a specific player, a specific situation such as field goal attempts during American football games or two outs during a baseball game. The notification categories may additionally comprise a list of users, or bettors, who have been identified as likely to place a wager on a wager described by the notification category's identifying wager criteria. The notification database 132 may further include a default notification method, including a specific haptic pattern or audio notification. The haptic pattern or audio notification may be unique, representing the specific category, or may otherwise be distinguishable from at least one other haptic pattern or audio notification representing a different category.

Figure 2:
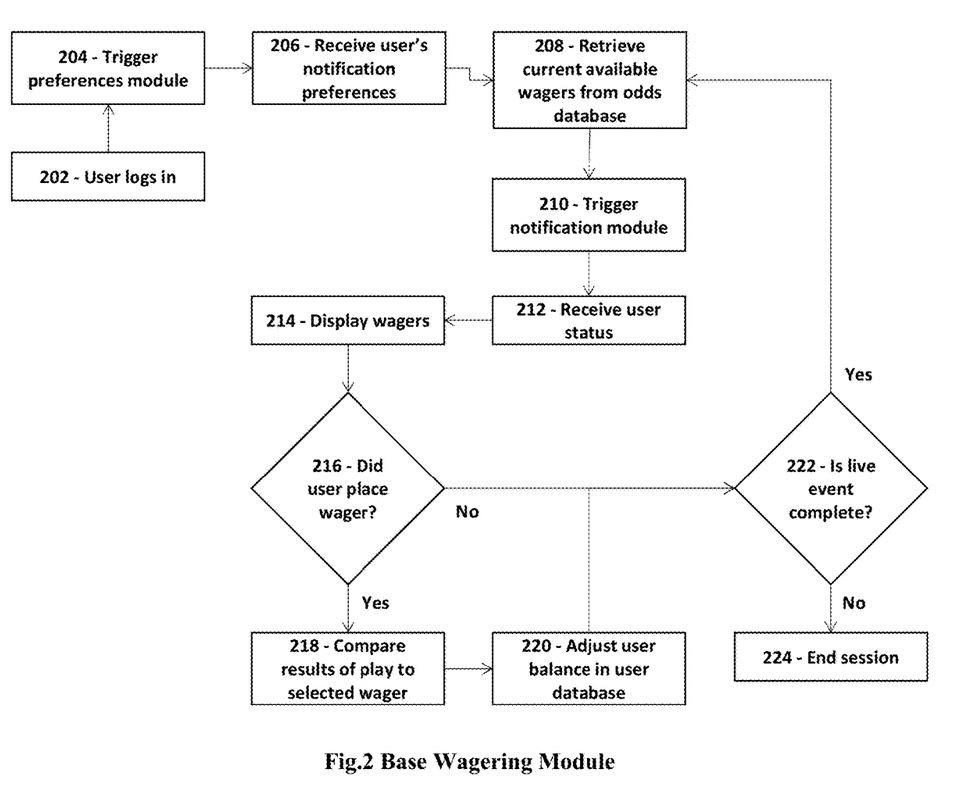
FIG. 2: illustrates a base wagering module, according to an embodiment.

FIG. 2 illustrates the "Base Wagering Module." The process may begin with the user logging in, at step 202, to the wagering app 110. The user may log in with a username and a password. The username may comprise an email address or a string of alphanumeric characters or symbols chosen by the user or generated randomly. Similarly, the password comprising alphanumeric characters or symbols may be chosen by the user or generated randomly. Alternatively, the user logging in using a password manager, which may store the username and password, may allow for using a universal password or PIN number, or biometrics including fingerprint, facial recognition, or iris scanning to authenticate the user, and log into the wagering app 110. The base wagering module 126 may trigger, at step 204, the preferences module 128 which may provide the user's identifying information, such as a user ID or account number, to the preferences module 128, retrieving the user's historical wagering data from the user database 118 and prompting the user for wager preferences. The preferences module 130 may further query the notification database 132 for default notifications and prompt the user for their notification preferences for each of the identified wagers preferred by the user. In an embodiment, the user ID for a user, John Smith, may be 3596344. The base wagering module 126 may receive, at step 206, the user's notification preferences from the preferences module 128. The notification preferences may be for the user John Smith comprising baseball games, especially those where the New York Yankees are competing and wagers involving batters, such as whether a batter will strike out or get a base hit or hit a home run, earn an RBI, etc. The notification preferences may additionally include the user Joe Smith's preferences for notifications for wagers where the New York Yankees are competing may be a haptic notification comprising activation of the mobile device's 108 haptic device 114 with five rapid pulses of 0.2 seconds with an interval of 0.1 second between pulses accompanied by the sound of a bat striking a ball unless the mobile device's volume is muted. The notification may alternatively or additionally be provided via a wearable device such as a smartwatch. The base wagering module 126 may retrieve, at step 208, the currently available wagers on the live event from the odds database 122 matching the user's notification preferences as identified by the preferences module 128. The odds may be calculated by the odds calculation module 124 and comprise a win condition and odds, which may be represented as a payout ratio, such as 5:1 where a person wagering $10 would receive $50 for a successful outcome. In an embodiment, the user John Smith's notification preferences including baseball games, specifically games where the New York Yankees are competing. Additionally, the user, John Smith's notification preferences, may comprise wagers on base hits. In an alternate embodiment, the user John Smith's notification preferences include wagers on American football games but do not include baseball games. In a further embodiment, an exemplary wager during a baseball game between the New York Yankees and the Boston Red Sox may be that the next batter will get a base hit at odds of 3:1. The wager may additionally include a default wager amount such as $50. The base wagering module 126 may trigger, at step 210, the notification module 130 with the available wagers. The notification module 130 may use the notification preferences stored in the notification database 132 to identify the appropriate notification method and notify the user via the user's mobile device 108 or a wearable device. Identifying the appropriate notification method may include prioritizing the notification based upon the user's preferences to increase the likelihood of a positive response, resulting in a wager being placed. The notification module 130 may further notify the user with the identified notification method and determine the user's status based upon whether the user opens the app, dismisses the notification without opening the app, or does nothing and returns the user's status to the base wagering module 126. In an embodiment, the available wagers may include a wager that the next batter during a baseball game between the New York Yankees and the Boston Red Sox will get a base hit at odds of 3:1 and the user's notification preferences including a wager involving a batter during a baseball game where the New York Yankees are competing. The base wagering module 126 may receive, at step 212, a user status from the notification module 130. The user status may be engaged if the user responds positively to the notification, dismissive if the user responds negatively to the notification, such as dismissing or silencing the notification, or unresponsive if the user fails to respond to the notification within a period. In an embodiment, the user John Smith may be determined to be engaged as he opened the wagering app 110 in response to the notification. In an alternate embodiment, the user John Smith may be determined to be dismissive if he dismissed the notification or silenced future notifications from the current live event 102. In a further embodiment, the user John Smith may be determined to be unresponsive if he does not respond to the notification before the opportunity to place a wager has passed. Alternatively, John Smith may be unresponsive if a predetermined period of five minutes has passed since the notification was provided. The base wagering module 126 may display, at step 214, the available wagers to the user via the wagering app 110 on the mobile device 108. The wagers may comprise at least a win condition and the odds being offered. The wagers, may include at least the wager related to the user's preferences which were used to identify the notification which was sent to the user. Similarly, the wagers displayed to the user may be related to the user preference related to the notification method used to notify the user. The wagers may additionally provide a default wager amount and a means of incrementing the wager amount or entering a custom wager amount. The wagers may additionally include a timer indicating the amount of time remaining during which a wager may be placed. In an embodiment, the wager may be that the next batter during a baseball game between the New York Yankees and the Boston Red Sox will get a base hit at odds of 3:1. The wager further may include a timer indicating that the user John Smith has 90 seconds remaining to place a wager. The base wagering module 126 may receive, at step 216, a wager from the user. The wager may comprise a wager amount that the win condition will occur at the specified odds such that the odds represent the multiple to be applied to the wager amount to determine the payout provided the user wins the wager. In an embodiment, the user John Smith may place a wager for $50 that the next batter will get a base hit at odds of 3:1. Alternatively, the user may not place a wager by either selecting an option to pass on placing a wager or allowing the opportunity period during which the user can place a wager to elapse. In an embodiment, the user John Smith may allow the opportunity period to elapse without placing a wager. The base wagering module 126 may compare, at step 218, the results of the play during the live event 102 to the win condition of the selected wager to determine whether the user won the wager. In an embodiment, the next batter may have struck out and did not get a base hit; therefore, the user John Smith did not win the wager. In an alternate embodiment, the next batter may have hit a double and therefore got a base hit, in which case the user John Smith won the wager. The base wagering module 126 may adjust, in step 220, the user's account balance according to the results of the wager. If the user lost the wager, the wager amount may be deducted from the user's account. Alternatively, if the user won the wager, the payout amount may be determined by multiplying the wager amount by the odds. The payout amount may then be added to the user's account balance. In an embodiment, the user John Smith may have lost the wager, and therefore the wager amount of $50 may be deducted from his initial account balance of $1200, resulting in a new account balance of $1150. In an alternate embodiment, the user John Smith may have won the wager, and a payout of $150, determined by multiplying the wager amount of $50 by the odds of 3:1, may be added to the initial account balance of $1200, resulting in a new account balance of $1350. The base wagering module 126 may determine, at step 222, whether the live event 102 may be complete. The live event 102 may be complete if it has concluded, such as the end of elapsed playtime during a sporting event. In an embodiment, a baseball game may be concluded after the third out of the top of the 9th inning if the home team is leading, after the third out of the top of the 9th inning if the away team is leading, or if the home team scores a winning run in the bottom of the 9th inning. A baseball game may additionally conclude in an inning beyond the 9th inning if the 9th inning concludes in a tie. If the live event 102 is not complete, returning to step 208 and retrieving currently available wagers from the odds database 122. The base wagering module 126 may end, at step 224, the session if the live event 102 is complete.

Figure 3:
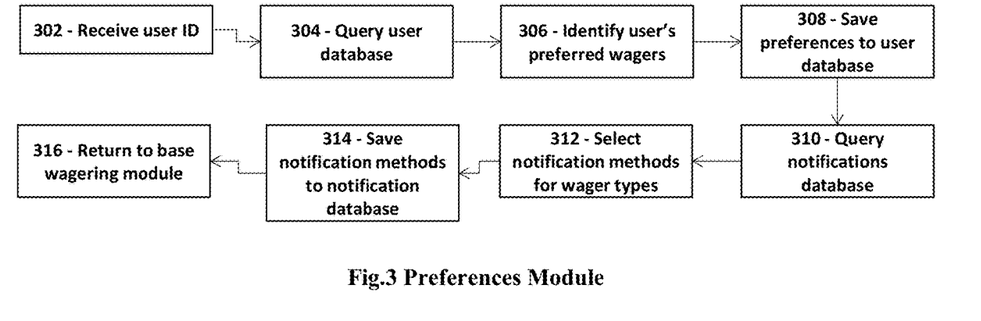
FIG. 3: illustrates a preferences module, according to an embodiment.

FIG. 3 illustrates the "Preferences Module." The process may begin with the preferences module 128 receiving, at step 302, a user ID from the base wagering module 126. The user ID may be associated with a user and their user account. In an embodiment, the user ID may be 3596344 and may be associated with a user, John Smith. The preferences module 128 may query, at step 304, the user database 118 for details associated with the user such as the user's previous wagers and wager preferences such as the types of live events 102, athletic teams, players, types of wagers, or odds on which the user prefers to place wagers. The wager information may additionally include geolocation data, such as locations where the user has previously placed wagers or the location of live events 102 and the proximity of the live event 102 wagered upon to the user. The user database 118 may additionally store contextual information about the user's wagers, such as wagers that were also placed by the users' friends and wagers placed as part of a parlay or as a hedge against another wager. The contextual information may also include whether a wager resulted from a challenge by a friend or a wagering app 110. The user database 118 may additionally include the wager amount and results of the wagers. In an embodiment, a previous wager placed by the user John Smith including a wager of $100, that Aaron Judge would hit a home run in an at-bat at odds of 10:1. The wager may further include the results that Aaron Judge hit a home run in the designated at-bat resulting in a $1000 payout. The preferences module 128 may identify, at step 306, the user's preferred wagers based on the user's wager history retrieved from the user database 118. The preferred wagers may include a type of wager which may be distinguished by any of the types of live event 102, athletic team, player, type of wager, or odds involved in the wager and are additionally wagered upon by the user at a significantly higher rate than other wagers, such as more than double the average wager. Alternatively, the preferred wagers may be determined by ranking the types of wagers by the total number of wagers placed by the user and selecting a predetermined number of the results, such as the top 5 wagers. In an embodiment, the user John Smith may be determined to prefer placing wagers on batters, such as whether they will get a base hit, strikeout, earn an RBI, etc., during an at-bat. The user's preferred wagers may additionally include contextual bets, such as parlaying or hedging a second bet with a first bet or placing a wager in response to a friend placing a wager or receiving a challenge from a friend to place a particular wager. Such contextual wagers may be determined to be a preferred type of wager if they represent a significant portion of the user's overall wagering activity or if the user meets or exceeds a predetermined threshold value representing the percentage of wagers placed to the number of total opportunities within a particular context. For example, if the user John Smith places a wager 60% of the time in response to the user John Smith's friend, Jane Doe, placing the same wager before John Smith, it may be determined that placing a wager in response to a friend's wager, especially his friend, Jane Doe, may be a preferred wager type for user John Smith as it exceeds a predetermined threshold value of 50%. Additionally, the user may manually provide preferences via a wagering app 110. The user's preferred wagers may additionally consider the user status in response to notifications such that wagers are more preferred if the user is engaged in response to notifications for that type of wager and less preferred if the user status is dismissive or unresponsive in response to a notification for a type of wager. The preferences module 128 may save, at step 308, the user's wager preferences to the user database 118. The user's wager preferences may comprise the types of wagers the user most frequently chooses to place wagers upon or the types of wagers the user has chosen as their preferred types of wagers via manually defined preference settings. In an embodiment, updating the user database 118 with the user John Smith's most preferred wagers on the outcome of a baseball player at bat, such as whether the player will get a base hit, strikeout, earn an RBI, etc. Additionally, saving the user John Smith's preferences to receive notifications for wagers during baseball games in which the New York Yankees are competing. The preferences module 128 may query, at step 310, the notification's database 132 for available notifications which may be used by the wagering app 110 to provide notifications to the user via a mobile device 108, wearable device, or other devices in communication with the mobile device 108 or wagering app 110 such as a headset, speaker, etc. The available notifications may include compatibility with the mobile device 108, wearable device, etc., being used by the user. Additionally, the available notifications may include haptic device 114 patterns or sounds associated with default notification methods for a particular type of wager. In an embodiment, the notification database 132, may include a default haptic pattern for available wagers where the New York Yankees are competing, which may be a haptic notification comprising activation of the mobile device's 108 haptic device 114 with three pulses of 0.4 seconds with an interval of 0.3 seconds between pulses accompanied by a segment of the song, New York, New York, unless the mobile device's volume is muted. The notification may alternatively or additionally be provided via a wearable device such as a smartwatch or clothing, including a haptic device 114. The notification database 132 may further store user-defined notification methods that may supersede default notifications, which may be used for contextual wagering opportunities, such as when a user's friend places a wager. The preferences module 128 may select, at step 312, notification methods for wager types matching the user's wager preferences. For example, a user Joe Smith's wager preferences include placing wagers on New York Yankee's batters, which may be paired with a notification comprising the sound of a bat hitting a ball and a haptic pattern of 130 Hz pulsing for 1.5 seconds with a pulse duration of 0.2 seconds and an interval of 0.1 seconds. Alternatively, the haptic device may be configured to deliver a haptic sensation mimicking the feeling of hitting a ball with a bat. In alternate embodiments, subscribing the user to a notification list such that the notification list contains all users who will be notified when the conditions defined by their wager preferences are met, resulting in them receiving a specified notification. In an embodiment, user Joe Smith may be subscribed to the New York Yankee's notification list such that when a wager may be available on a New York Yankee's game, the users subscribed to the list may receive a notification comprising a ten-second clip of the song, New York, New York accompanied by a two-second haptic notification pulsing with a frequency of 140 Hz for 0.3 seconds with an interval of 0.2 seconds. Notification methods may additionally be paired with other notification events, such as indicating the result of a play or a wager. In an embodiment, the user Joe Smith placing a wager on Aaron Rodgers getting a base hit in his next at-bat and receiving a notification comprised of the sound of a bat hitting a ball and a haptic sensation mimicking the feeling of a bat hitting a ball if the wager may be successful. Alternatively, the user Joe Smith may receive audio playback of an umpire calling the batter "out" if the wager was unsuccessful, which may optionally include a haptic component such as pulsing three times. The preferences module 128 may save, at step 314, the notification methods to the notification database 126. The notification methods may include the default notifications methods for a wager or may include notification methods that the user has customized. In an embodiment, saving the user John Smith's notification method for wagers where the New York Yankees are competing in a baseball game with activation of the mobile device's 108 haptic device 114 with five rapid pulses of 0.2 seconds with an interval of 0.1 seconds between pulses and the sound of a crowd cheering, instead of the default notification method. The preferences module 128 may return, at step 316, to the base wagering module 128 with the user's notification preferences. In an embodiment, the notification preferences for a user John Smith, including receiving notifications for wagers during baseball games in which the New York Yankees are competing involving the outcome of a baseball player's at-bat, such as whether the player will get a base hit, strikeout, earn an RBI, etc. The notification preferences may further comprise a notification method chosen by the user John Smith comprising activation of the mobile device's 108 haptic device 114 with five rapid pulses of 0.2 seconds with an interval of 0.1 seconds between pulses or a sound accompanying the haptic notification of a bat striking a ball.

Figure 4:
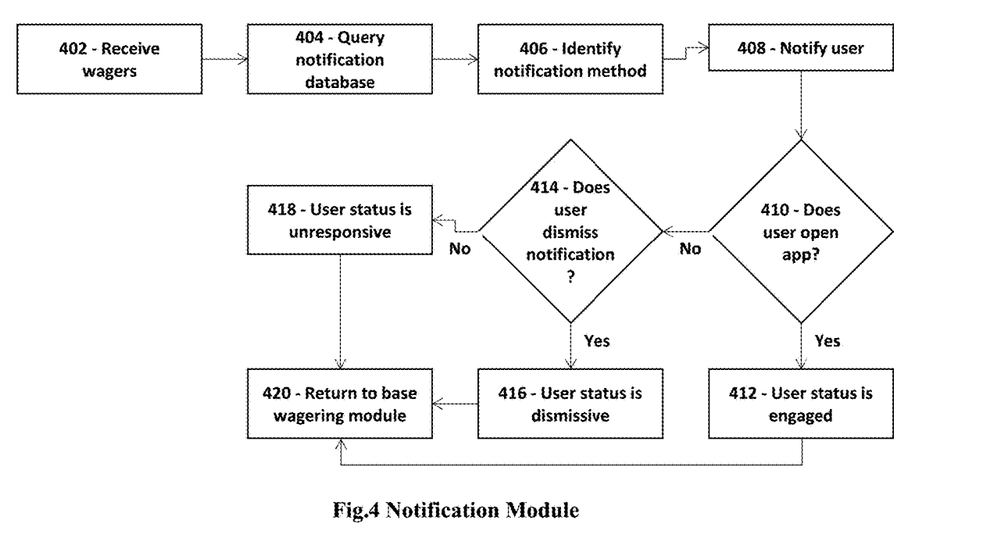
FIG. 4: illustrates a notification module, according to an embodiment.

FIG. 4 illustrates the "Notification Module." The process may begin with the notification module 130 receiving, at step 402, wagers and associated notification preferences for a user. In an embodiment, the wagers may include that the next batter during a baseball game between the New York Yankees and the Boston Red Sox, Aaron Judge, will get a base hit at odds of 3:1 and the notification preferences for the user John Smith including a wager involving a batter during a baseball game where the New York Yankees are competing. The notification module 130 may query, at step 404, the notification database 132 for the user's preferred notification methods. The user's preferred notification methods may comprise default haptics and sounds, customized haptics and sounds, or a combination of default and customized haptics and sounds. Haptics comprising the activation of at least one haptic device, such as an oscillating mass creating vibrations within a mobile device 108 or a wearable device. Additionally, the notification methods may include audio, like music, a synthesized voice, or sound effects. In an embodiment, a notification method comprising a pulsing haptic device 114 in a mobile device and playing a sound effect of an air horn blast. The notification module 130 may identify, at step 406, the notification method to be used to notify the user. The notification method may be chosen based upon the user's notification preferences, either prioritizing the user's manually defined prioritization preferences, such as preferring to receive a notification that the wager relates to the New York Yankees rather than a baseball game, or that a wager relates to their preferred player, Aaron Judge, instead of the type of live event 102 or the team participating in the live event 102. Alternatively, the notification method selected may be related to the most frequently placed wagers. For example, if a user, John Smith, placed wagers on 20% of opportunities to wager on the New York Yankees but wagered on 50% of opportunities to wager on Aaron Judge, then the higher frequency wager type, on Aaron Judge, would take priority and the notification related to wagers involving Aaron Judge would be used. Alternatively, the notification priority may be related to the wager amount, such as the wager type upon which the user typically wagers more money. The wager amount may include the total wager amount, average wager amount, maximum wager amount, etc. Notification methods may further be prioritized by context, such as always prioritizing notification methods related to wagers placed by a friend or where a friend has issued a challenge to the user to place a specific wager. Multiple notification methods may alternatively be used together, such as using the haptic notification from a first notification method and the audio notification from a second notification method or by using a selection of notification methods in sequence, such as playing an air horn, which may be the notification method defined by user John Smith indicating a challenge by a friend, immediately followed by New York, New York with an accompanying haptic notification with the haptic device 114 of the mobile device 108 synchronized with the beat of the song to indicate the wager relates to the New York Yankees. The notification module 130 may notify, at step 408, the user using the identified notification method. The notification method may comprise at least one haptic component and optionally including an audio component. In an embodiment, the user John Smith's mobile device 108 vibrating five times with each pulse of vibrations lasting 0.2 seconds with an interval of 0.1 seconds between each pulse and additionally using the speakers on the mobile device 108 to play the sound of a bat striking a ball to notify the user that a wager may be available on a baseball play involving a batter. The notification module 130 may determine, at step 410, whether the user opens the wagering app 110 in response to the notification. The user may open the wagering app 110 via a visual notification provided on the display of a mobile device 108, using a verbal command to a digital assistant, or navigating to the wagering app 110 via the mobile device's 108 home screen. In an embodiment, the user John Smith opens the wagering app 110 by tapping on a notification on the screen of a mobile device 108. The notification module 130 may determine, at step 412, whether the user is engaged by determining if they expressed a positive reaction to the notification by opening the wagering app 110 and saving the engaged user status to the user database 118. In an embodiment, the user John Smith's user status may be determined to be engaged as he opened the wagering app 110. In further embodiments, the user may need to open the wagering app 110 within a predefined period to have a user status of engaged, such as five minutes from when the notification was provided or before the opportunity to place a wager on the selected wager has elapsed. The notification module 130 may determine, at step 414, whether the user dismissed the notification. The user dismissed the notification if they chose to clear the notification from their mobile device 108 without opening the wagering app 110. Alternatively, the user may open the wagering app 110 and silence further notifications during the current live event 102. In an embodiment, the user John Smith cleared the visual notification from the mobile device 108 without opening the wagering app 110. The notification module 130 may determine, at step 416, if the user is dismissive because they cleared the notification from their mobile device 108 without opening the wagering app 110 or silencing further notifications during the live event 102 and saving the dismissive user status to the user database 118. In an embodiment, the user John Smith has a user status of dismissive because he opened the wagering app and selected an option to silence all further notifications during the current live event 102. The notification module 130 may determine, at step 418, if the user is unresponsive if the user does not interact with the mobile device 102 or the notification provided to the user within a predetermined period and saving the unresponsive user status to the user database 118. In an embodiment, the user John Smith may be determined to be unresponsive because he did not interact with the mobile device 108 within five minutes of the notification being provided. In an alternate embodiment, the user John Smith interacting with the mobile device, however not interacting with the wagering app 110 or the provided notification. The notification module 130 may returning, at step 420, to the base wagering module 126 with the user status. The user status may be engaged, dismissive, unresponsive, etc. In an embodiment, returning the base wagering module 126 may mean that the user John Smith is engaged.

Figure 5:
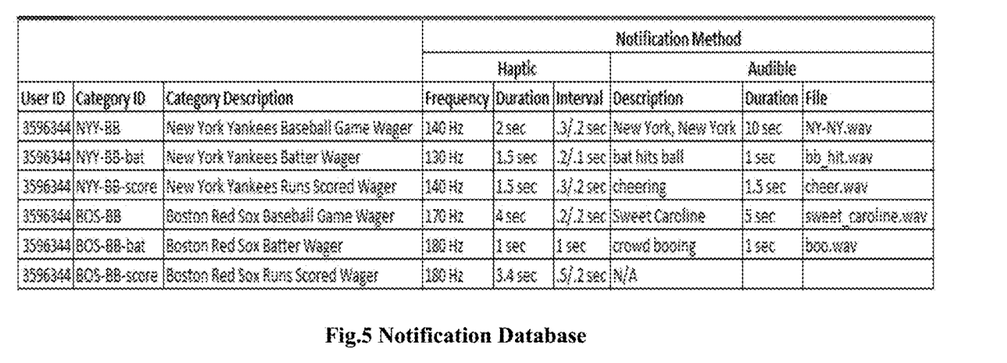
FIG. 5: illustrates a notification database, according to an embodiment.

FIG. 5 illustrates the "Notification Database." The notification database 132 may store notification methods for different wager types. The wager types can be categorized based on at least one defining characteristic of the wager, such as the type of live event 102, the teams or players competing in the live event 102 or participating in a play for which a wager may be offered, or the type of play the wager describes. Additionally, the defining characteristic may relate to the odds being offered as well as the context of the wager, such as whether the user's friend has placed a wager or whether the wager is the subject of a challenge issued by a friend, another user, or a wagering app 110. The notification methods associated with each wager type may be configured by the administrator of a wagering network 116 or may otherwise be customized by a user via a wagering app 110. The notification methods may involve a haptic component and an audible component. The notification database 132 may be populated by the administrator of a wagering network 116 or the preferences module 130 and may be used by the preferences module 128 and the notification module 130. Customizations by the preferences module 130 may include the creation of new haptic and audio effects or the modification of an existing haptic or audio effect including any of the type of haptic effect, its magnitude, duration, etc. and similarly the selection, volume, duration, etc. of the audio component. The haptic component may include any vibrotactile haptics, ultrasonic mid-air haptics, microfluidics, force control haptics, or surface haptics. It may be utilized to simulate a recognizable physical sensation, such as the feeling of hitting a bat with a ball, catching a ball in a glove, kicking a football, hitting a ball with a tennis racket, etc. Alternatively, the haptic component may not simulate a physical sensation but instead be identifiable compared to other haptic elements used for other notification methods. The audio component may be any sound effect, voice recording, an audio clip from an audio or video recording, or at least part of a musical composition. For example, a sound effect may include the sound of a bat hitting a ball, of a ball being caught by a glove, of helmets clashing at the line of scrimmage during an American football game, or a golf club hitting a golf ball. Voice recordings may be prerecorded, such as an umpire at a baseball game calling a player "out," or may be custom recordings by the user of a wagering app 110. Audio clips could be recognizable segments from a previous live event 102, including broadcasts by sports announcers, commentators, or news persons related to a previous live event 102. Music may be closely associated with athletic teams participating in a live event 102, such as New York, New York sung by Frank Sinatra, which the New York Yankees typically play after home game victories or Sweet Caroline sung by Neil Diamond, which may be played during the seventh-inning stretch at Boston Red Sox home games at Fenway Park, or Chelsea Dagger by the Fratelli's which may be a frequent theme song for the Chicago Blackhawks. Songs may be associated due to them regularly being played in the teams' respective home stadiums, ballparks, arenas, etc., or the songs may be composed for or mention a team or performed by an artist closely affiliated with an artist athletic team's home city. Such songs may be used as the audio component of a notification method for wagers for the team with which the songs relate, such as playing New York, New York for a wager being offered on a game or play involving the New York Yankees, or Sweet Caroline for the Boston Red Sox. The haptic component may complement the audio component by matching the beat or rhythm of a song. For example, a wager on a play during a hockey game may be indicated by the sound of ice skates that a referee's whistle may accompany, or the sound of a dribbling basketball could indicate a play on a basketball game squeaking of shoes sliding on a basketball court. A user may record a taunt to send to a friend and used as a notification when a friend places a wager or friend issues a challenge to the user. The notification methods may be used in combination, such as playing the sound of a bat hitting a ball and the sensation of a bat hitting a ball created by a haptic device 114 to indicate the wager relates to a play involving a batter which may be immediately followed by a segment of New York, New York indicating the wager also involves the New York Yankees. Similarly, a unique sound effect may be chosen to represent multiple characteristics of a wager, such as the P. C. Richards & Son "whistle" which the New York Yankees use during home games, which may be used to represent a wager on a New York Yankees pitcher. A haptic representation of the rhythm may accompany the sound effect, or the notification method may be comprised solely by the haptic representation of the rhythm without the accompanying audio.

The foregoing description and accompanying figures illustrate the principles, preferred embodiments, and modes of operation of the invention. However, the invention should not be construed as being limited to the embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for providing a haptic notification to a user or cohort of users on a sport wagering network, comprising:
    determining at least one haptic notification preference;
    delivering at least one haptic notification to a user based on a haptic notification preference;
    determining at least one user status based on an interaction with a haptic notification;
    displaying at least one wager based on a user status on a wagering application;
    determining if at least one wager was placed and adjusting at least one user balance depending on an outcome of a wager, and
    automatically outputting at least one haptic notification when at least one user within the sports wagering network issues a bet-related challenge.

2. The method for providing a haptic notification to a user or cohort of users on a sport wagering network of claim 1, wherein determining the haptic notification preference comprises receiving at least haptic notification preference data from a notification database.

3. The method for providing a haptic notification to a user or cohort of users on a sport wagering network of claim 1, wherein the haptic notification further comprises at least one haptic component and one audible component.

4. The method for providing a haptic notification to a user or cohort of users on a sport wagering network of claim 3, wherein the haptic component further comprises at least one of a vibrotactile haptic, an ultrasonic mid-air haptic, a force control haptic, a microfluidics, a surface haptic, a vibration, a pulse, and a sensation.

5. The method for providing a haptic notification to a user or cohort of users on a sport wagering network of claim 3, wherein the audible component further comprises at least one of a sport equipment sound, a sporting event sound, a voice recording, an audio clip from an audio or video recording, a portion of a musical composition.

6. The method for providing a haptic notification to a user or cohort of users on a sport wagering network of claim 1, wherein the haptic notification preference comprises a predetermined haptic notification for at least an event, a player, a team, a play, a time, a score, a type of wager, or an outcome.

7. The method for providing a haptic notification to a user or cohort of users on a sport wagering network of claim 1, wherein the user status further comprises at least one of engaged, dismissive, or unresponsive.

8. The method for providing a haptic notification to a user or cohort of users on a sport wagering network of claim 1, wherein displaying the wager comprises displaying at least a wager amount, a custom wager amount, and a timer indicating a remaining period to place the wager.

9. A system for providing a haptic notification to a user or cohort of users on a sport wagering network, comprising:
- a base wagering module;
- a preferences module;
- a notification module; and
- a notification database; wherein
  - the base wagering module is configured to initiate the preferences module, receive at least one haptic notification preference, retrieve at least one set of wager odds from an odds database, initiate a notification module, receive at least one user status, display at least one wager, determine if at least one wager was placed, adjust a user balance according to an outcome of an event and wager, and determine if a live event has concluded;
  - the preferences module is configured to query a user database for at least one user ID, determine at least one wager preference, store at least one wager preference in the user database, query and select at least one notification method for a wager type from the notifications database, and store at least one notification method to the notification database;
  - the notification module is configured to receive at least one wager, query and identify at least one notification method from the notification database, deliver at least one notification to at least one user, determine if the user opens, dismisses, or is unresponsive to the notification, and send at least one user status to the base wagering module;
  - the notification module is configured to provide haptic notifications when at least one other user on the sports wagering network makes a bet-related challenge; and
  - the notification database is configured to store at least one notification method for at least one wager type.

10. The system for providing a haptic notification to a user or cohort of users on a sport wagering network of claim 9, wherein the notification database is configured by an administrator or the preferences module.

11. The system for providing a haptic notification to a user or cohort of users on a sport wagering network of claim 9, wherein the notification method stored in the notification database is further configured to be at least a haptic component and an audible component.

12. The system for providing a haptic notification to a user or cohort of users on a sport wagering network of claim 11, wherein the haptic component is configured to be at least one of a vibrotactile haptic, an ultrasonic mid-air haptic, a force control haptic, a microfluidics, a surface haptic, a vibration, a pulse, and a sensation.

13. The system for providing a haptic notification to a user or cohort of users on a sport wagering network of claim 11, wherein the audible component is configured to be at least one of a sport equipment sound, a sporting event sound, a voice recording, an audio clip from an audio or video recording, a portion of a musical composition.

* * * * *